(12) United States Patent
Dalsgaard et al.

(10) Patent No.: US 10,117,141 B2
(45) Date of Patent: Oct. 30, 2018

(54) INHIBITING THE TRANSMISSION OF MEASUREMENT REPORTS FROM A UE WHEN A UE IS IN AN INACTIVE MODE AND APPLIES DRX

(71) Applicant: Nokia Technologies Oy, Espoo (FI)

(72) Inventors: Lars Dalsgaard, Oulu (FI); Jorma Johannes Kaikkonen, Oulu (FI); Niko Kolehmainen, Espoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/760,994

(22) PCT Filed: Jan. 18, 2013

(86) PCT No.: PCT/US2013/022261
§ 371 (c)(1),
(2) Date: Jul. 14, 2015

(87) PCT Pub. No.: WO2014/113023
PCT Pub. Date: Jul. 24, 2014

(65) Prior Publication Data
US 2015/0365859 A1 Dec. 17, 2015

(51) Int. Cl.
*H04W 36/00* (2009.01)
*H04W 52/02* (2009.01)
*H04W 76/28* (2018.01)

(52) U.S. Cl.
CPC ... *H04W 36/0088* (2013.01); *H04W 52/0209* (2013.01); *H04W 52/0212* (2013.01); *H04W 76/28* (2018.02)

(58) Field of Classification Search
CPC ......... H04W 52/0209; H04W 52/0212; H04W 52/0251; H04W 52/0216; H04W 24/10; H04W 36/0083
See application file for complete search history.

(56) References Cited

U.S. PATENT DOCUMENTS

2008/0160918 A1* 7/2008 Jeong ............... H04W 52/0216 455/67.11
2008/0232310 A1* 9/2008 Xu ..................... H04W 76/048 370/329

(Continued)

FOREIGN PATENT DOCUMENTS

JP WO 2011162134 A1 * 12/2011 ............ H04W 36/30

OTHER PUBLICATIONS

Author Unknown, UE measurement behavior in long DRX, Submission to 3GPP TSG-RAN WG 2, Doc. No. R2-081099, Feb. 15, 2008, pp. 1-3.*

(Continued)

*Primary Examiner* — Christopher Crutchfield
(74) *Attorney, Agent, or Firm* — Mintz Levin Cohn Ferris Glovsky and Popeo, P.C.

(57) ABSTRACT

Methods and apparatus, including computer program products, are provided for determining whether a user equipment is in an inactive connected mode, i.e. applies discontinuous reception DRX mode, during a period of inactive data reception; and disabling a timer for triggering a measurement report at the user equipment, when the user equipment applies DRX mode, wherein the disabled timer inhibits the measurement report related to a target cell from being sent by the user equipment. Related apparatus, systems, methods, and articles are also described.

17 Claims, 4 Drawing Sheets

(56) References Cited

U.S. PATENT DOCUMENTS

| | | | |
|---|---|---|---|
| 2010/0190488 A1 | 7/2010 | Cheon et al. | |
| 2010/0317345 A1* | 12/2010 | Futaki | H04W 36/0055 455/436 |
| 2012/0190373 A1* | 7/2012 | Tenny | H04W 56/0015 455/447 |
| 2012/0307669 A1* | 12/2012 | Kim | H04W 24/10 370/252 |
| 2013/0114568 A1* | 5/2013 | Sagae | H04W 72/085 370/332 |
| 2013/0196664 A1* | 8/2013 | Yiu | H04W 72/0493 455/436 |
| 2014/0313920 A1* | 10/2014 | Chai | H04W 24/10 370/252 |
| 2014/0321371 A1* | 10/2014 | Anderson | H04W 76/028 370/329 |
| 2015/0045029 A1* | 2/2015 | Dalsgaard | H04W 36/0083 455/436 |
| 2016/0021581 A1* | 1/2016 | Deenoo | H04W 36/0055 370/331 |

OTHER PUBLICATIONS

Author Unknown, RRC Connected DRX and dedicated UL resource release, submission to 3GPP TSG RAN WG2 #61, Doc. No. R2-081157, Feb. 15, 2008, pp. 1-4.*
Author Unknown, Inter-freq/RAT measurements without measurement, Submission to 3GPP TSG-RAN2 Meeting 60b, Doc. No. R2-080961, Jan. 18, 2007, pp. 1-2.*
Author Unknown, 3GPP TS 36.331, version 10.4.0, Dec. 2011, pp. 1-108.*
International Search Report and Written Opinion received for corresponding Patent Cooperation Treaty Application No. PCT/US2013/022261, dated Jun. 2, 2011, 18 pages.
3GPP TSG RAN WG4: "3GPP TSG RAN WG4 Meeting #48bis; R4-082654; LS measurement reporting in DRX". 3GPP draft; R4-082654,3rd Genereation Partnership Project (34GPP), Mobile Competence Centre; 650 Route Des Lucioles; F-06921 Sophia-Antipolis Cedex; France; no. Scotland; Oct. 6, 2008.
Samsung: "3GPP TSG RAN WG4 Meeting #49bis; R4-090132; Further Consideration on Time to trigger for Measurement Report in DRX", 3GPP Draft; R-4-090132, 3rd Genereation Partnership Project (3GPP). Mobile Competence Centre; 650 Route Des Lucioles; F-06921 Sophia-Antipolis Cedex; France; no. Ljubljana Jan. 12, 2009.
3GPP, "Technical Specification Group Access Network; Evolved Universal Terrestrial Radio Access (E-UTRA); Multiplexing and channel coding (Release 11)," 3rd Generation Partnership Project, 3GPP TS 36.212 V11.1.0, Dec. 2012.
3GPP, "Technical Specification Group Radio Access Network; Evolved Universal Terrestrial Radio Access (E-UTRA); LTE physical layer; General description (Release 11)," 3rd Generation Partnership Project, 3GPP TS 36.201 V11.1.0, Dec. 2012.
3GPP, "Technical Specification Group Radio Access Network; Evolved Universal Terrestrial Radio Access (E-UTRA); Physical channels and modulation (Release 11)," 3rd Generation Partnership Project, 3GPP TS 36.211 V.11.1.0, Dec. 2012.
3GPP, "Technical Specification Group Radio Access Network; Evolved Universal Terrestrial Radio Access (E-UTRA); Physical layer procedures (Release 8)," 3rd Generation Partnership Project, 3GPP TS 36.213 V8.2.0, Mar. 2008.
3GPP, "Technical Specification Group Radio Access Network; Evolved Universal Terrestrial Radio Access (E-UTRA); Physical; Measurements (Release 11)," 3rd Generation Partnership Project, 3GPP TS 36.214 V11.1.0, Dec. 2012.
3GPP, "Technical Specification Group Radio Access Network; Evolved Universal Terrestrial Radio Access (E-UTRA); Radio Resource Control (RRC); Protocol specification (Release 11)," 3rd Generation Partnership Project, 3GPP TS 36.331 V11.2.0, Dec. 2012.
3GPP, "Technical Specification Group Radio Access Network; Evolved Universal Terrestrial Radio Access (E-UTRA); Medium Access Control (MAC) protocol specification (Release 10)," 3rd Generation Partnership Project, 3GPP TS 36.321 V10.7.0, Dec. 2012.

* cited by examiner

INHIBITING THE TRANSMISSION OF MEASUREMENT REPORTS FROM A UE WHEN A UE IS IN AN INACTIVE MODE AND APPLIES DRX

RELATED APPLICATION

This application was originally filed as PCT Application No. PCT/US2013/022261 filed Jan. 18, 2013.

FIELD

The subject matter disclosed herein relates to wireless communications.

BACKGROUND

In enhanced Universal Terrestrial Radio Access Network (E-UTRAN), connected mode provides a user equipment assisted, network controlled handover. For example, the network may configure the user equipment with a measurement configuration, and, based on the configuration, the user equipment may then perform measurements and report those measurements to the network. The network may, based on the measurement report, command the user equipment to change cells to a target cell.

E-UTRAN also supports radio resource control (RRC) connected mode discontinuous reception mode (hereinafter referred to as DRX and/or connected mode DRX). Connected mode DRX may enable improved user equipment power saving opportunities for user equipment by allowing the user equipment to enter an inactive state (for example, switch off its receiver) for a certain period of time before it has to become active to listen to a control channel to determine whether there is a scheduled data transmission for the user equipment. When the network configures the user equipment with DRX, the network may define the value of an inactivity timer for the DRX. This DRX inactivity timer is restarted whenever a new data block is sent, but if data is not sent, the inactivity DRX timer may expire, triggering the user equipment to apply DRX. DRX is described in 3GPPP TS 36.321, V11.1.0 (2012-12), 3rd Generation Partnership Project, Technical Specification Group Radio Access Network, Evolved Universal Terrestrial Radio Access (E-UTRA), Medium Access Control (MAC) protocol specification (Release 11), Jan. 2, 2013, hereinafter TS 36.321.

DRX enables a user equipment, such as for example a smart phone and the like, to stay in connected mode for longer periods of time even though the user equipment does not have an ongoing continuous data transmission. Specifically, the user equipment may apply DRX between actual data transmissions to facilitate power savings during these inactive data transmission periods. Moreover, the use of DRX may enable user equipment power saving, without the network having to push the user equipment to an idle mode, as the user equipment can enter DRX based on the DRX inactivity timer noted above.

Although DRX enables power saving, DRX may introduce a mobility challenge as the user equipment is not required to perform as many measurements in DRX mode when compared to non-DRX mode (for example, during an active data transmission session), especially for long DRX periods of about 640 milliseconds and above, for high velocity user equipment, and smaller cells of a heterogeneous network.

The expected increase in wireless data transmissions may mean that there will be a need to deploy more network capacity. One efficient way to increase the network capacity is by deploying small cells for offloading purposes or offloading cells in general. These small cells can be deployed on the same or separate carriers relative to the serving cell, and the mixed environment with macro/large cells and small cells are often referred to heterogeneous networks (hetnets). Use of hetnets may provide opportunities for offloading traffic from the macrocells to a typically higher speed or capacity small cell.

The heterogeneous network may include one or more wireless access points, or base stations, such as for example an E-UTRAN (evolved Universal Mobile Telecommunications System Terrestrial Radio Access Network) NodeB base station serving macrocells, and one or more small cell base stations serving small cells. For example, a small cell base station (or a wireless access point or a remote radio head) may be implemented to cover a small cell, or coverage area, examples of which include a residence, a small business, a building, an office, or a small area. As such, the small cell base station, such as for example a home base station (HNB), a home E-UTRAN NodeB base station (HeNB), a WiFi access point, and the like, may be configured to have functionality similar to a typical base station, such as for example an E-UTRAN NodeB (eNB) base station, but the small cell base station may have less/smaller coverage/range and lower power capabilities given its limited coverage area or class. For example, the small cell base station may be implemented as a femtocell wireless access point/base station having power sufficient for a cell serving wireless devices within a limited range of about tens of meters. Picocell base stations are another example of a small cell base station, but picocell base stations have somewhat greater range serving a small area on the order of about 100-200 meters. Accordingly, wireless service providers view small cell base stations as a way to extend service coverage into a small cell, as a way to offload traffic to the small cell base stations, and/or as a way to provide enhanced service, such as for example higher data rates, lower latencies, energy efficiency and the like, within the small cell, when compared to the larger macrocell served by a typical base station, such as for example the eNB base station.

SUMMARY

In some example embodiments, there is provided a method for disabling a time-to-trigger timer to inhibit handovers. The method may include determining whether a user equipment is in an inactive connected mode during a period of inactive data reception; and disabling a timer for triggering a measurement report at the user equipment, when the user equipment is in the inactive connected mode, wherein the disabled timer inhibits the measurement report related to a target cell from being sent by the user equipment.

In some variations, one or more of the following features can optionally be included in any feasible combination. The inactive connected mode may include at least one of a discontinuous reception mode, a radio resource control connected mode discontinuous reception, a long discontinuous reception, or a discontinuous reception exceeding a predetermined time period. The target cell may include a small cell. The timer may be disabled based on a determination of whether an inactivity timer elapses, the inactivity timer reset when a data is sent, received, or a combination thereof. The timer may be enabled, when the inactivity timer is at least one of started, initiated, or running. The timer may include a time-to-trigger timer.

Articles are also described that comprise a tangibly embodied computer-readable medium embodying instructions that, when performed, cause one or more machines (for example, computers, etc.) to result in operations described herein. Similarly, apparatus are also described that can include a processor and a memory coupled to the processor. The memory can include one or more programs that cause the processor to perform one or more of the operations described herein.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the subject matter disclosed herein. In the drawings.

Figure 1:
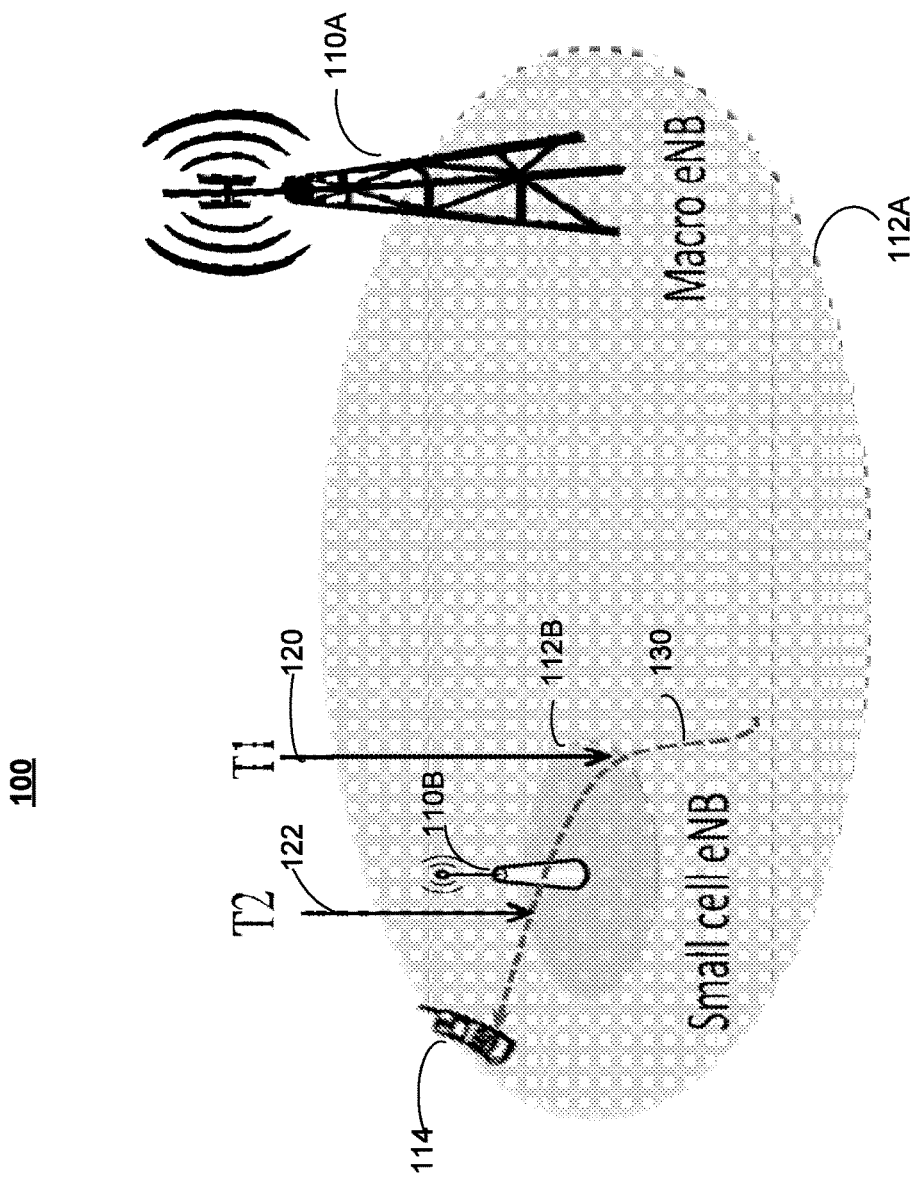
FIG. 1 depicts an example of a system, in accordance with some example embodiments.

Like labels are used to refer to same or similar items in the drawings.

DETAILED DESCRIPTION

In some example embodiments, the subject matter disclosed herein relates to disabling a time-to-trigger (TTT) timer related to event reporting of small cells in a heterogeneous network. In some example embodiments, the TTT timer may be disabled when the user equipment is in an idle or inactive data transmission mode, such as for example a connected mode DRX, a long DRX, and/or a DRX cycle exceeding a certain time threshold. In some example embodiments, the TTT timer may be disabled by the user equipment, when the user equipment applies DRX and a target cell, such as for example a small cell, of a heterogeneous network is encountered. As used herein, the disabling of the TTT timer refers to stopping, ignoring, and/or ignoring the TTT timer or the expiry of the TTT timer.

In some example embodiments, the disabling of the TTT timer may prevent the user equipment from reporting measurement information for an event associated with the target cell, such as for example the small cell, to the network. Because the network does not receive a measurement report related to the target cell, such as for example a small cell, the network will likely not command a handover of the user equipment to the target/small cell, while the user equipment is in an inactive data transmission state as represented by DRX. In other words, the disabling of the TTT timer is performed, so that a user equipment applying DRX (for example, without a current, active data transmission) will not trigger measurement reporting for target cells, such as for example small cells—disabling thus target/small cell inbound handovers when there is no need for such a handover. Indeed, a user equipment in DRX does not have active traffic demands, so it would be a waste of signaling resources to offload this DRX mode user equipment to the target/small cell, when there is no data to offload.

In some example embodiments, the TTT timer may be implemented in accordance with the Time-to-Trigger information elements described in 3GPP TS 36.331.

FIG. 1 depicts an example system 100 including a wireless access point, such as for example a evolved Node B base station 110A, serving a macrocell 112A. The system 100 also includes another wireless access point, such as for example a small cell evolved Node B base station 110B, serving a small cell 112B. FIG. 1 also depicts user equipment 114 as it travels along a path 130 including time T1 120 representative of when user equipment 114 enters small cell 112B coverage and time T2 122 representative of when user equipment 114 exits small cell 112B coverage.

When user equipment 114 is in a connected mode and actively sending/receiving traffic (for example, not in a connected discontinuous reception (DRX) mode (for example, more or less continuously monitoring for potential allocations), the user equipment 114 at time T1 120 may detect an event. In some example embodiments, events refer to measurement events triggering a report to the network, such as for example events A1, A2, A3, and the like defined in, 3GPP TS 36.331, although other types of measurement events may be used as well. In any case, at time T1 120, an event me be detected when the user equipment 114 enters small cell 112B. For example, the event may represent measurement event A3 corresponding to small cell 112B becoming offset better than the serving macro cell 112A, although other types of measurement events may be used as well. In this example, user equipment 114 (which in this example is non-DRX) would send, if the event has been fulfilled for all measurements during TTT and after the time-to-trigger (TTT) timer elapses, a measurement report identifying the event A3 and related information to the network, such as for example base station 110A and the like, which may result in a handover to small cell 112B. This handover to small cell 112B allows offloading traffic to the small cell 112B and small cell base station 110B. And similar when at time T2 122, for example, the event may represent measurement event A3 corresponding to macro cell 112A becoming offset better than the serving small cell 112B, although other types of measurement events may be used as well. In this example, user equipment 114 (which in this example is non-DRX) would send, if the event has been fulfilled for all measurements during TTT and after the time-to-trigger (TTT) timer elapses, a measurement report identifying the event A3 and related information to the network, such as for example base station 110B and the like, which may result in a handover to macro cell 112A. Another typical example of event used for this purpose could e.g. be event A4.

However, when user equipment 114 is in a DRX mode, such as for example a long DRX and the like, user equipment 114 at time T1 120 may encounter a target cell, such as for example small cell 112B. In some example embodiments, the TTT timer may be disabled. When the TTT timer is disabled, the TTT timer never triggers the user equipment to send a measurement report to the network, such as for example base station 110A and the like. In this example, user equipment 114 is in a so-called inactive data transmission state (for example, there is no active data transmissions between network and user equipment—without active data reception (or transmission) as evident by the fact that long cycle DRX is applied, so performing a handover to small cell 112B (for example, to offload traffic) represents a waste of resources given that the user equipment 114 has no current traffic to offload to the small cell 112B. When user equipment 114 applies DRX, such as for example a long cycle DRX, user equipment 114 may at time T2 122 encounter an exit event (for example, event A4) related to small cell 112B. But the TTT timer may, in some example embodiments, be disabled, so that the user equipment 114 is never triggered to send the measurement report of the event to the network. At some point, the user equipment 114 may change states from DRX to an active, non-DRX state when there is data transmission activity (for example, be "onDuration" with "drx-InactivityTimer" running between T1 120 and T2 122). When this is the case, the TTT timer may be enabled as noted above to trigger measurement reporting to the network.

Although the previous example refers to the A3 Event, other events including newly defined events may be used as well.

In some example embodiments, the events associated with a target cell, such as for example small cell 112B, may have different event criteria for triggering measurement report sending to the network used to determine whether a handover should be performed. And, the events may be implemented in accordance with 3GPP TS 36.331, although other types of events may be used as well.

In some example embodiments, the TTT timer is enabled when the DRX inactivity timer is started or has not elapsed. For example, the DRX inactivity timer is started (or reset) when data is transmitted or received at the user equipment, so as long as the inactivity timer has not elapsed the user equipment is not in DRX. However, the TTT timer may not be applied (for example, disabled), when the inactivity timer has expired or is not running (which indicates DRX), a media access control (MAC) DRX command has been received, and/or the DRX is long (or above a defined threshold). As such, the DRX inactivity timer may, in some example embodiments, be used to trigger enabling or disabling of the TTT timer as disclosed herein.

In some example embodiments, when the DRX inactivity timer is started or running (for example, when data is received resetting or re-starting the DRX inactivity timer), the TTT timer is also enabled, as noted above, and thus applied for measurement events related to cells, including small cell. For example, when an uplink or downlink allocation indication of new data is received on the physical downlink control channel (PDCCH), the TTT timer is enabled (for example, started, triggered, and the like), enabling thus the TTT timer. On the other hand, the TTT timer may be disabled, when the DRX inactivity timer is not running or has elapsed.

Although some of the example disclosed herein refer to disabling the TTT timer related to event reporting for small cells when the user equipment is in DRX, the disabling of the TTT time may also be used with other types of cells which are candidates for offloading traffic to avoid handovers to those cells while in DRX or other data idle modes. Moreover, in some example embodiments, the TTT timer may be disabled for small cell events only when the user equipment is in a long cycle DRX, so that TTT timer disabling is not performed when the user equipment is not in DRX (for example, non-DRX) or in a short cycle DRX (for example, a short DRX cycle shorter that a given time limit).

Before providing additional examples, the following provides additional description with respect to the example system framework 100 depicted at FIG. 1.

FIG. 1 depicts a system 100 according to some example embodiments. System 100 may include one or more user equipment, such as for example user equipment 114, and one or more access points, such as for example base stations 110A-B. In some example embodiments, base station 110A may serve a cell, such as for example macrocell 112A, and base station 110B may serve a small cell 112A, such as for example a picocell, a femtocell, a home base station, and the like, although base stations 110A-B may serve other types of cells as well. In other examples the cells (that being either macro cells or small cells) may be co-located. Moreover, the base stations 110A-B may have wired and/or wireless backhaul links to other network nodes, such as for example a mobility management entity, other base stations, a radio network controller, a core network, a serving gateway, and/or the like. The macrocell 112A and small cell 112B may be on the same or different carriers. In the case of the same carrier, measurement restrictions, such as for example in Time Domain enhanced Inter-Cell Interference Coordination, may be configured as well.

In some example embodiments, the user equipment 114 may be implemented as a mobile device and/or a stationary device. The user equipment can be referred to as, for example, mobile stations, mobile units, subscriber stations, wireless terminals, tablets, smart phones, a wireless handheld device, a wireless plug-in accessory, or the like. In some example embodiments, the user equipment may include one or more processors, one or more computer-readable storage medium (for example, memory, storage, and/or the like), one or more radio access components (for example, a modem, a transceiver, and/or the like), and/or a user interface.

In some example embodiments, the user equipment 114 may be implemented as multi-mode user devices configured to operate using a plurality of radio access technologies, although a single-mode device may be used as well. For example, user equipment 114 may be configured to operate using a plurality of radio access technologies including one or more of the following: Long Term Evolution (LTE), wireless local area network (WLAN) technology, such as for example 802.11 WiFi and/or the like, Bluetooth, Bluetooth low energy (BT-LE), near field communications (NFC), and any other radio access technologies. Moreover, the user equipment 114 may be configured to have established connections to access points using a plurality of the radio access technologies.

The base stations 110A-B may, in some example embodiments, be implemented as an evolved Node B (eNB) type base station, although other types of radio, access points may be implemented as well. When the evolved Node B (eNB) type base station is used, the base stations, such as for example base stations 110A-B, may be configured in accordance with standards, including the Long Term Evolution (LTE) standards, such as for example 3GPP TS 36.201, Evolved Universal Terrestrial Radio Access (E-UTRA), Long Term Evolution (LTE) physical layer, General description, 3GPP TS 36.211, Evolved Universal Terrestrial Radio Access (E-UTRA), Physical channels and modulation, 3GPP TS 36.212, Evolved Universal Terrestrial Radio Access (E-UTRA), Multiplexing and channel coding, 3GPP TS 36.213, Evolved Universal Terrestrial Radio Access (E-UTRA), Physical layer procedures, 3GPP TS 36.214, Evolved Universal Terrestrial Radio Access (E-UTRA), Physical layer—Measurements Protocol specification, 3GPP TS 36.331, Technical Specification Group Radio Access Network, Evolved Universal Terrestrial Radio Access (E-UTRA), Radio Resource Control (RRC), and any subsequent additions or revisions to these and other 3GPP series of standards (collectively referred to as LTE standards). The base stations 110A-B may also be configured to serve cells using a WLAN technology, such as for example WiFi (for example, the IEEE 802.11 series of standards), as well as any other radio access technology capable of serving a cell.

In some example embodiments, system 100 may include access links. The access links may include a downlink for transmitting to the user equipment 114 and an uplink for transmitting from user equipment 114 to a base station. The downlink may comprise a modulated radio frequency carrying information, such as for example user data, radio resource control (RRC) messages, information configuring a user equipment, handover commands, and/or the like, to user equipment 114, and the uplink may comprise a modulated radio frequency carrying information, such as for example user data, RRC messages, user equipment capabilities reporting, measurement reports, and/or the like, from the user equipment 114 to a base station. The downlinks and uplinks may, in some example embodiments, each represent a radio frequency (RF) signal. The RF signal may, as noted above, carry data, such as for example voice, video, images, Internet Protocol (IP) packets, control information, and any other type of information and/or messages. For example, when LTE is used, the RF signal may use OFDMA. OFDMA is a multi-user version of orthogonal frequency division multiplexing (OFDM). In OFDMA, multiple access is achieved by assigning, to individual users, groups of subcarriers (also referred to as subchannels or tones). The subcarriers are modulated using BPSK (binary phase shift keying), QPSK (quadrature phase shift keying), or QAM (quadrature amplitude modulation), and carry symbols (also referred to as OFDMA symbols) including data coded using a forward error-correction code. The subject matter described herein is not limited to application to OFDMA systems, LTE, LTE-Advanced, or to the noted standards, specifications, and/or technologies.

Although FIG. 1 depicts a specific quantity and configuration of base stations, cells, and user equipment, other quantities and configurations may be implemented as well.

Figure 2A:
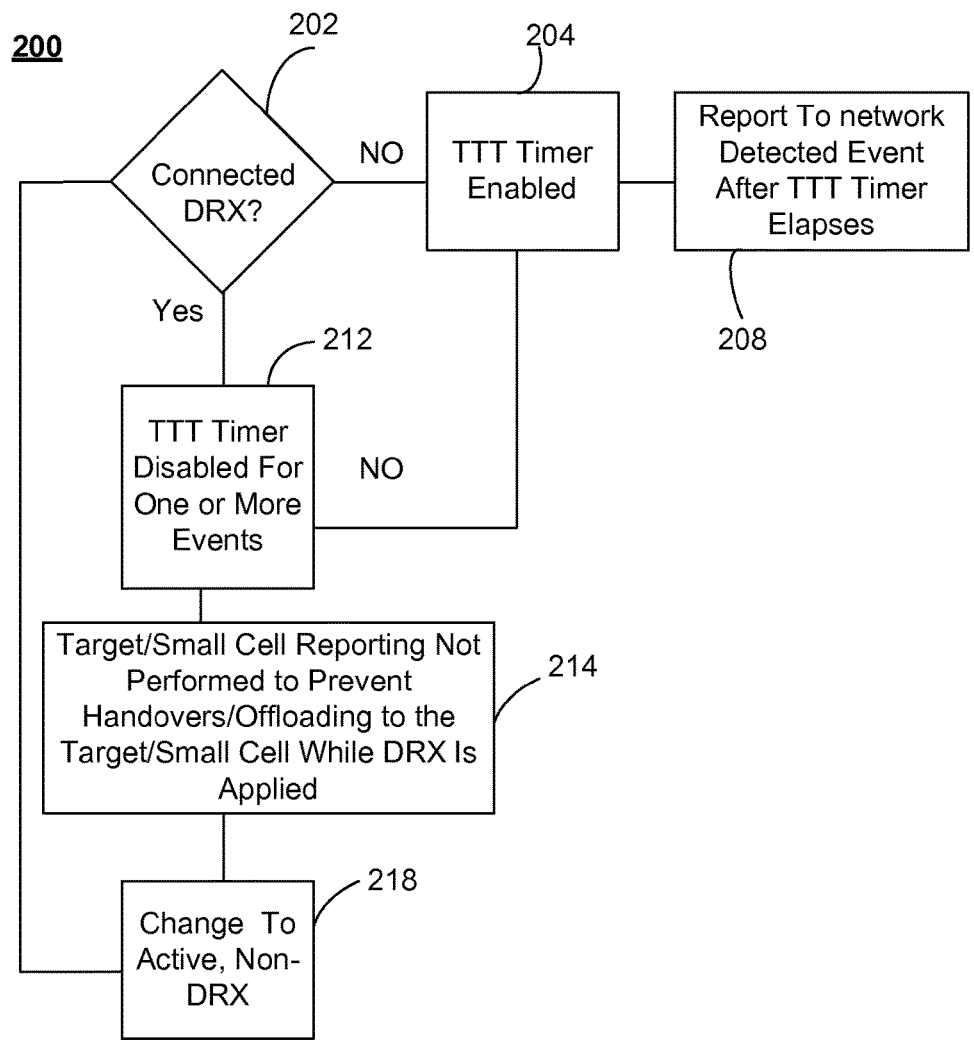
FIG. 2A depicts an example of a process for disabling a time-to-trigger timer, in accordance with some example embodiments.
Figure 2B:
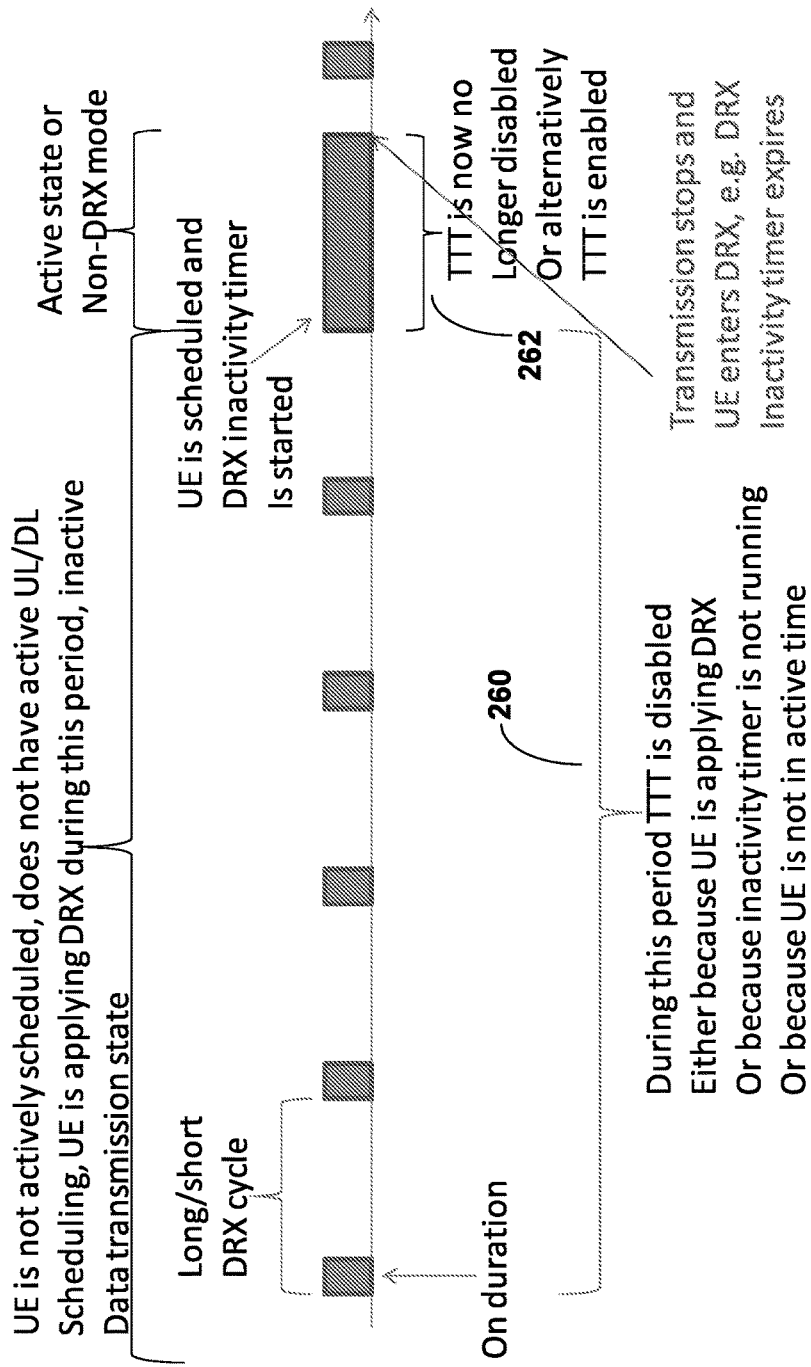
FIG. 2B depicts an example of a timeline during which the time-to-trigger timer is disabled, in accordance with some example embodiments.

FIG. 2A depicts an example of a process 200 for disabling a TTT timer for measurement reporting, when the user equipment applies DRX. For example, applying DRX may refer to the user equipment following the reception and transmission cycle determined by DRX configuration after a defined timer, such as "drx-InactivityTimer," has elapsed, such as a long DRX cycle and the like as defined in 3GPPP TS 36.321, V11.1.0 (2012-12) and any subsequent revisions thereto. FIG. 2B depicts an example timeline including a first time period 260 during which the TTT timer may be disabled in accordance with some example embodiments. This TTT timer disabling may be due in part to the user equipment applying DRX, an inactivity timer that is not running (or expired), and/or an inactive time of data transmission. FIG. 2B also depicts a second time period 262 during which the user equipment is in an active state (e.g., non-DRX). During this second time period 262, the TTT timer is enabled (e.g., not disabled).

Referring again to FIG. 2A, the disabling of the TTT timer may, in some example embodiments, inhibit handovers of the user equipment to a target cell, when the user equipment does not have active data transmissions as indicated by the DRX state. The description of FIG. 2A also refers to FIG. 1.

At 202, it is determined whether the user equipment 114 is applying DRX. When the user equipment 114 is actively scheduled for active data transmission via the uplink/downlink, the user equipment does not apply DRX (for example, the user equipment may not enter an inactive data transmission state but instead will be in an active state (e.g., non-DRX mode). When the user equipment 114 is not actively scheduled by network for data transmission via the uplink/downlink, the user equipment 114 may apply DRX. For example, an inactivity timer may be reset whenever the user equipment sends or receives new data. However, the user equipment 114 may apply DRX, when the DRX inactivity timer expires (or a certain time thereafter) representing a state where some time has elapsed since active data reception/transmission. When DRX is applied (e.g., a long DRX cycle and the like), the user equipment 114 is not required to continuously monitor links, such as for example the downlink physical downlink control channel (PDCCH); nor is the user equipment 114 required to perform continuous mobility measurements. The user equipment 114 may or may not be required to detect measurement/reporting events, such as for example event A3, A5, and the like. However, in some example, embodiments, the TTT timer is disabled when DRX is applied at the user equipment 114, so a detected measurement event is not reported while DRX is applied, as described further below.

If the user equipment 114 has not applied DRX (also referred to herein as non-DRX mode or active), the user equipment 114 is in an active transmission state. In some example embodiments, when the user equipment 114 is in a non-DRX state, the TTT timer associated with measurement reporting may be enabled (no at 202 and 204). For example, when in a non-DRX mode, the user equipment 114 may continuously monitor the downlink PDCCH for scheduling, continuously perform measurements for mobility, and/or detect events to determine whether a report should be generated and sent at 208 to the network. If an event is detected, the user equipment 114 may report at 208 after the expiry of the TTT timer to the network, which may result in a handover decision to a target cell, such as for example small cell 112B. In some example embodiments, the TTT timer is enabled based on the DRX inactivity timer, as described herein.

However, if the user equipment 114 applies DRX, the TTT timer associated with measurement reporting may be disabled at 212, in accordance with some example embodiments. For example, the TTT timer may not elapse, may be stopped, if running, may not be not started, may be ignored, and/or any other type of disabling, so that the user equipment having the disabled TTT trigger while DRX is applied does not send measurement reports to the network. In some example embodiments, the TTT timer may only be disabled when the user equipment is applying a long DRX cycle. This long DRC cycle may span a time, such as for example several seconds or even minutes (although other times are possible). In some example embodiments, the TTT timer may be disabled based on the DRX inactivity timer. For example, the TTT timer may be enabled while the DRX inactivity timer is running, but the TTT timer may be disabled when the DRX inactivity timer expires, triggering the application of DRX (for example, a long DRX cycle) at the user equipment.

In some example embodiments, the disabling of TTT timer for selected events may be configured at the user equipment by the network in measurement configuration information sent to the user equipment.

At 214, when an event is related to a target cell, such as small cell 112B, is encountered, the user equipment 114 having a disabled TTT timer as noted at 212 may inhibit measurement reporting to the network, which may further inhibit handover and offloading to the target cell, such as small cell 112B, while DRX is applied, in accordance with some example embodiments.

At 218, the user equipment 114 may revert to a non-DRX mode, when there is traffic to send or receive to the network, in which case process 200 may repeat. For example, when new traffic is received, the new traffic may trigger the user equipment to apply a non-DRX state to allow active data transmission/reception. In some example embodiments, the TTT timer may be enabled based on the DRX inactivity timer. For example, when the DRX inactivity timer is activated/restarted/running, the TTT timer is also enabled to allow measurement reporting to the network.

In some example embodiments, the selected cells (for example, small cells for offloading) may be determined based on a physical cell identifier, and disabling the TTT timer is applied when one of the selected cells is covered by a given event. For example, in the case of an Event A3, the TTT timer can be disabled for such a case when the considered neighbor cell would be one of the selected, or identified, cells for offloading. Similarly for Event A4 (for example, a neighbor cell becomes better than a threshold), the TTT timer can be disabled when the considered neighbor cell would be an offloading cell. Moreover, the disabling the TTT timer may for example be applied to any cell (or list of cells) on an indicated frequency.

In some example embodiments, disabling the TTT timer may also allow the TTT timer value to be set more aggressively, for example, at a smaller time value, to promote fast offloading, when data transmission starts without risking a substantial increase in handover related signaling and other issues such as handover errors and ping-pongs which may otherwise occur.

Figure 3:
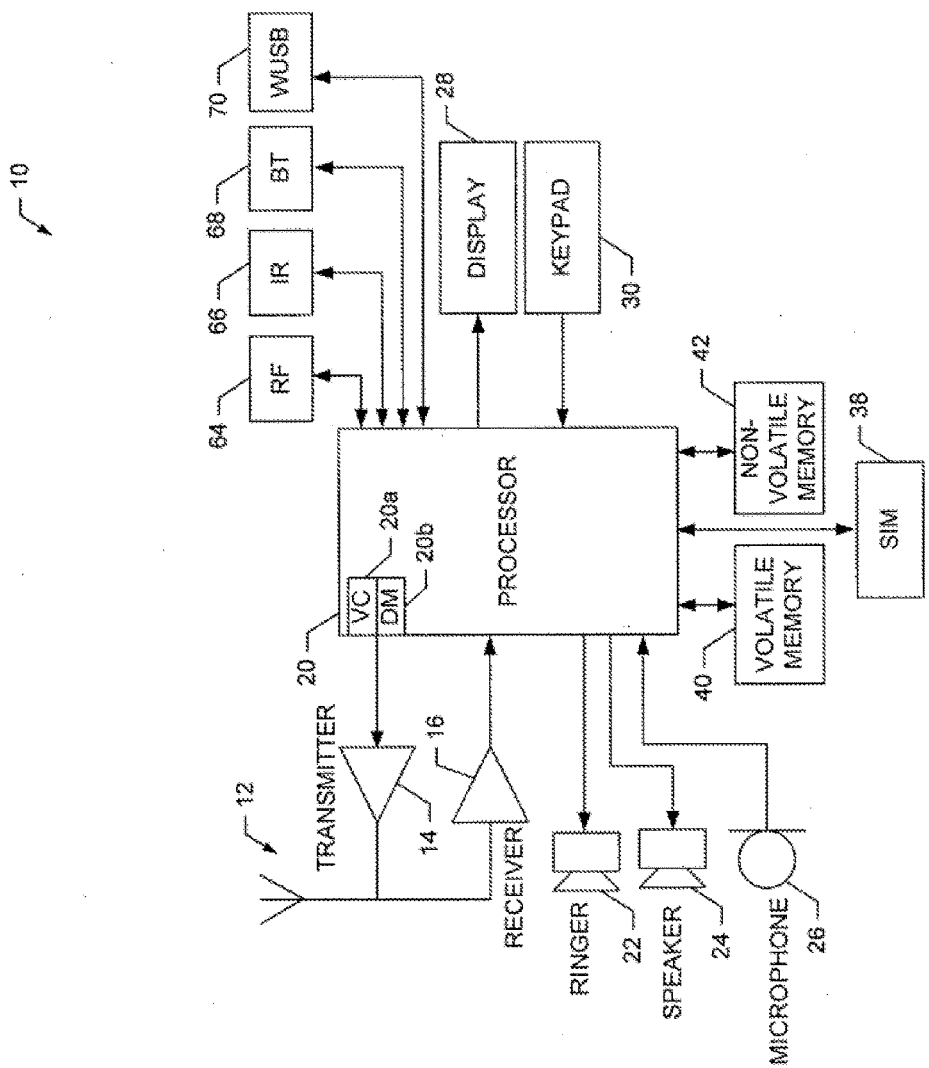
FIG. 3 depicts an example of an apparatus, in accordance with some example embodiments.

FIG. 3 illustrates a block diagram of an apparatus 10 such as, for example, a user equipment, in accordance with some example embodiments. While several features of the apparatus are illustrated and will be hereinafter described for purposes of example, other types of electronic devices, such as for example mobile telephones, mobile computers, portable digital assistants (PDAs), pagers, laptop computers, desktop computers, gaming devices, televisions, routers, home gateways, and other types of electronic systems, may employ one or more of the embodiments disclosed herein.

The apparatus 10 may include at least one antenna 12 in communication with a transmitter 14 and a receiver 16. Alternatively transmit and receive antennas may be separate.

The apparatus 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise processor 20 may be configured to control other elements of apparatus 10 by effecting control signaling via electrical leads connecting processor 20 to the other elements, such as for example a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and the like), or some combination thereof. Accordingly, although illustrated in FIG. 3 as a single processor, in some example embodiments the processor 20 may comprise a plurality of processors or processing cores.

Signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques, such as for example Institute of Electrical and Electronics Engineers (IEEE) 802.11, 802.16, and/or the like. In addition, these signals may include speech data, user generated data, user requested data, and/or the like.

The apparatus 10 may be capable of operating with one or more air interface standards, communication protocols, modulation types, access types, and/or the like. More particularly, the apparatus 10 may be capable of operating in accordance with various first generation (1G) communication protocols, second generation (2G or 2.5G) communication protocols, third-generation (3G) communication protocols, fourth-generation (4G) communication protocols, Internet Protocol Multimedia Subsystem (IMS) communication protocols (for example, session initiation protocol (SIP) and/or the like. For example, the apparatus 10 may be capable of operating in accordance with 2G wireless communication protocols IS-136, Time Division Multiple Access TDMA, Global System for Mobile communications, GSM, IS-95, Code Division Multiple Access, CDMA, and/or the like. Also, for example, the apparatus 10 may be capable of operating in accordance with 2.5G wireless communication protocols General Packet Radio Service. (GPRS), Enhanced Data GSM Environment (EDGE), and/or the like. Further, for example, the apparatus 10 may be capable of operating in accordance with 3G wireless communication protocols, such as for example Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 10 may be additionally capable of operating in accordance with 3.9G wireless communication protocols, such as for example Long Term Evolution (LTE), Evolved Universal Terrestrial Radio Access Network (E-UTRAN), and/or the like. Additionally, for example, the apparatus 10 may be capable of operating in accordance with 4G wireless communication protocols, such as for example LTE Advanced and/or the like as well as similar wireless communication protocols that may be subsequently developed.

Some Narrow-band Advanced Mobile Phone System (NAMPS) and Total Access Communication System (TAGS) mobile terminal apparatuses may also benefit from one or more embodiments disclosed herein as should dual or higher mode phone apparatuses, for example, digital/analog or TDMA/CDMA/analog phones. Additionally, apparatus 10 may be capable of operating according to Wi-Fi or Worldwide Interoperability for Microwave Access, WiMAX, protocols.

It is understood that the processor 20 may comprise circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor 20 may additionally comprise an internal voice coder (VC) 20a, an internal data modem (DM) 20b, and/or the like. Further, the processor 20 may include functionality to operate one or more software programs, which may be stored in memory. In general, processor 20 and stored software instructions may be configured to cause apparatus 10 to perform actions. For example, processor 20 may be capable of operating a connectivity program, such as for example a web browser. The connectivity program may allow the apparatus 10 to transmit and receive web content, such as for example location-based content, according to a protocol, such as for example wireless application protocol, WAP, hypertext transfer protocol, HTTP, and/or the like Apparatus 10 may also comprise a user interface including, for example, an earphone or speaker 24, a ringer 22, a microphone 26, a display 28, a user input interface, and/or the like, which may be operationally coupled to the processor 20. In this regard, the processor 20 may include user interface circuitry configured to control at least some functions of one or more elements of the user interface, such as for example, for example, the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 10 may include a battery for powering various circuits related to the mobile terminal, for example, a circuit to provide mechanical vibration as a detectable output. The user input interface may comprise devices allowing the apparatus 20 to receive data, such as for example a keypad 30, a touch display, a joystick, and/or at least one other input device. In some embodiments including a keypad, the keypad may include numeric 0-9 and related keys, and/or other keys for operating the apparatus 10.

As shown in FIG. 3, apparatus 10 may also include one or more mechanisms for sharing and/or obtaining data. For example, the apparatus 10 may include a short-range radio frequency (RF) transceiver, and/or interrogator 64, so data may be shared with and/or obtained from electronic devices in accordance with RF techniques. The apparatus 10 may include other short-range transceivers, such as for example, for example, an infrared (IR), transceiver 66, a Bluetooth (BT), transceiver 68 operating using Bluetooth wireless technology, a wireless universal serial bus (USB) transceiver 70 and/or the like. The Bluetooth transceiver 68 may be capable of operating according to low power or ultra-low power Bluetooth technology, for example, Wibree, radio standards. In this regard, the apparatus 10 and, in particular, the short-range transceiver may be capable of transmitting data to and/or receiving data from electronic devices within a proximity of the apparatus, such as for example within 10 meters, for example. The apparatus 10 may also be capable of transmitting and/or receiving data from electronic devices according to various wireless networking techniques, including 6LoWpan, Wi-Fi, Wi-Fi low power, WLAN techniques such as for example IEEE 802.11 techniques, IEEE 802.15 techniques, IEEE 802.16 techniques, and/or the like.

The apparatus 10 may comprise memory, such as for example a subscriber identity module (SIM) 38, a removable user identity module (R-UIM), and/or the like, which may store information elements related to a mobile subscriber. In addition to the SIM, the apparatus 10 may include other removable and/or fixed memory. The apparatus 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, etc., optical disc drives and/or media, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing functions of the user equipment/mobile terminal. The memories may comprise an identifier, such as for example an international mobile equipment identification (IMEI) code, capable of uniquely identifying apparatus 10. The functions may include one or more of the operations disclosed herein with respect to the user equipment, such as for example, the functions disclosed at process 200 (e.g., disabling the TTT timer and the like). The memories may comprise an identifier, such as for example an international mobile equipment identification (IMEI) code, capable of uniquely identifying apparatus 10.

Without in any way limiting the scope, interpretation, or application of the claims appearing below, a technical effect of one or more of the example embodiments disclosed herein is preventing unnecessary handovers and offloads of user equipment with no current data offloading requirements. Another technical effect of one or more of the example embodiments disclosed herein is handovers to small cells may be inhibited without regard to speed. Another technical effect of one or more of the example embodiments disclosed herein is reduction of handover signaling.

Some of the embodiments disclosed herein may be implemented in software, hardware, application logic, or a combination of software, hardware, and application logic. The software, application logic, and/or hardware may reside on memory 40, the control apparatus 20, or electronic components, for example. In some example embodiment, the application logic, software or an instruction set is maintained on any one of various conventional computer-readable media. In the context of this document, a "computer-readable medium" may be any media that can contain, store, communicate, propagate or transport the instructions for use by or in connection with an instruction execution system, apparatus, or device, such as for example a computer, with one example of a computer described and depicted in FIG. 3. A computer-readable medium may comprise a non-transitory computer-readable storage medium that may be any media that can contain or store the instructions for use by or in connection with an instruction execution system, apparatus, or device, such as for example a computer. And, some of the embodiments disclosed herein include computer programs configured to cause methods as disclosed herein (see, for example, process 200 and the like).

If desired, the different functions discussed herein may be performed in a different order and/or concurrently with each other. Furthermore, if desired, one or more of the above-described functions may be optional or may be combined. Although various aspects of the invention are set out in the independent claims, other aspects of the invention comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of the present invention as defined in the appended claims. Other embodiments may be within the scope of the following claims. The term "based on" includes "based on at least."

What is claimed:

1. A method comprising:
   determining, by a user equipment, a condition triggering the user equipment to operate according to an inactive connected mode comprising a discontinuous reception;
   disabling, by the user equipment and while the user equipment operates according to the inactive connected mode, a time-to-trigger timer for triggering a measurement report related to a target cell, wherein the disabling of the time-to-trigger timer inhibits triggering the measurement report from being sent to a macro cell; and
   enabling the time-to-trigger timer for triggering the measurement report, when the user equipment has active data transmission ongoing.

2. A method of claim 1, wherein the inactive connected mode comprises at least one of a discontinuous reception mode, a radio resource control connected mode discontinuous reception, a long discontinuous reception, or a discontinuous reception exceeding a predetermined time period, wherein the inactivity timer is started, initiated, and/or re-started when a new data block representative of active data transmission is sent by the user equipment.

3. A method of claim 1, wherein the target cell comprises a small cell, and wherein the disabling comprises at least one of stopping the time-to-trigger timer, ignoring the time-to-trigger timer, and ignoring an expiration of the time-to-trigger timer.

4. A method of claim 1, wherein the condition comprises an inactivity timer elapsing, and wherein the inactivity timer is reset when data is sent and/or received.

5. A method of claim 1, further comprising:
   detecting, by the user equipment, an event associated with target cell for sending the measurement report; and
   ignoring, by the user equipment, the event when the time-to-trigger timer is disabled.

6. A method of claim 5, wherein the event comprises at least one of the target cell becoming better offset than the macro cell, or the macro cell becoming better offset than the target cell.

7. An apparatus, comprising:
   at least one processor; and
   at least one memory including computer program code, the at least one memory and the computer program code configured to, with the at least one processor, cause the apparatus to at least:
      determine a condition triggering the apparatus to operate according to an inactive connected mode comprising a discontinuous reception;
      disable, while operating according to the inactive connected mode, a time-to-trigger timer for triggering a measurement report related to a target cell, wherein the disabled time-to-trigger timer inhibits triggering the measurement report from being sent to a macro cell; and
      enable the time-to-trigger timer for triggering the measurement report, when the apparatus has active data transmission ongoing.

8. An apparatus of claim 7, wherein the inactive connected mode comprises at least one of a discontinuous reception mode, a radio resource control connected mode discontinuous reception, a long discontinuous reception, or a discontinuous reception exceeding a predetermined time period, wherein the inactivity timer is started, initiated, and/or re-started when a new data block representative of active data transmission is sent by the apparatus.

9. An apparatus of claim 7, wherein the target cell comprises a small cell, and wherein the disabling comprises at least one of stopping the time-to-trigger timer, ignoring the time-to-trigger timer, and ignoring an expiration of the time-to-trigger timer.

10. An apparatus of claim 7, wherein the condition comprises an inactivity timer elapsing, and wherein the inactivity timer is reset when data is sent and/or received.

11. An apparatus of claim 7, wherein the apparatus is further caused to at least:
    detect an event associated with target cell for sending the measurement report; and
    ignore the event when the time-to-trigger timer is disabled.

12. An apparatus of claim 7, wherein the event comprises at least one of the target cell becoming better offset than the macro cell, or the macro cell becoming better offset than the target cell.

13. An apparatus of claim 7, wherein the apparatus comprises, or is comprised in, a user equipment.

14. A non-transitory machine-readable medium encoded with instructions that, when executed by at least one processor, causes operations comprising:
    determining, by a user equipment, a condition triggering the user equipment to operate according to an inactive connected mode comprising a discontinuous reception;
    disabling, by the user equipment and while the user equipment operates according to the inactive connected mode, a time-to-trigger timer for triggering a measurement report related to a target cell, wherein the disabling of the time-to-trigger timer inhibits triggering the measurement report from being sent to a macro cell; and
    enabling the time-to-trigger timer for triggering the measurement report, when the user equipment has active data transmission ongoing.

15. A non-transitory machine-readable medium of claim 14, wherein the inactive connected mode comprises at least one of a discontinuous reception mode, a radio resource control connected mode discontinuous reception, a long discontinuous reception, or a discontinuous reception exceeding a predetermined time period, wherein the inactivity timer is started, initiated, and/or re-started when a new data block representative of active data transmission is sent by the user equipment.

16. A non-transitory machine-readable medium of claim 14, wherein the target cell comprises a small cell, and wherein the disabling comprises at least one of stopping the time-to-trigger timer, ignoring the time-to-trigger timer, and ignoring an expiration of the time-to-trigger timer.

17. A non-transitory machine-readable medium of claim 14, wherein the condition comprises an inactivity timer elapsing, and wherein the inactivity timer is reset when data is sent and/or received.

* * * * *